United States Patent [19]

Gamblin

[11] Patent Number: 4,657,590
[45] Date of Patent: Apr. 14, 1987

[54] BASIC DYE INK FORMULATIONS AND METHODS

[75] Inventor: Rodger L. Gamblin, Dayton, Ohio

[73] Assignee: The First National Bank of Cincinnati, Cincinnati, Ohio

[21] Appl. No.: 663,230

[22] Filed: Oct. 22, 1984

[51] Int. Cl.$^4$ ................. C09D 11/00; C09D 11/14; C08L 1/26
[52] U.S. Cl. ............................. 106/22; 106/26; 524/43; 524/44
[58] Field of Search ............... 106/22, 20, 26, 14.0 F, 106/14.18; 524/43, 44

[56] References Cited

U.S. PATENT DOCUMENTS

| | | | |
|---|---|---|---|
| 117,314 | 7/1871 | McIlvaine | 106/22 |
| 140,782 | 7/1873 | Jud | 106/22 |
| 1,439,489 | 12/1922 | Shinozaki | 106/22 |
| 1,787,233 | 12/1930 | Bivins | 106/20 |
| 1,833,086 | 11/1931 | Middleton | 106/22 |
| 1,843,661 | 2/1932 | Cooney | 106/23 |
| 2,208,551 | 7/1940 | Waters | 106/22 |
| 2,327,594 | 8/1943 | Erickson et al. | 106/30 |
| 2,327,595 | 8/1943 | Erickson et al. | 106/30 |
| 2,327,596 | 8/1943 | Erickson et al. | 106/30 |
| 2,327,597 | 8/1943 | Erickson et al. | 106/30 |
| 2,346,969 | 4/1944 | Jeuck et al. | 106/30 |
| 2,375,230 | 5/1945 | Kline et al. | 106/22 |
| 2,389,371 | 11/1945 | Kroeger et al. | 106/30 |
| 2,621,130 | 12/1952 | Cutler et al. | 106/24 |
| 2,623,827 | 12/1952 | Manuel | 106/23 |
| 2,623,827 | 12/1952 | Moos | 106/23 |
| 2,636,015 | 4/1956 | Schmutzler | 524/377 |
| 2,681,317 | 6/1956 | Grossman | 252/301.34 |
| 2,771,372 | 11/1956 | Chambers et al. | 106/22 |
| 2,868,741 | 1/1969 | Chambers et al. | 106/26 |
| 2,966,417 | 12/1961 | Anderson | 106/22 |
| 2,992,198 | 7/1961 | Funahashi | 524/313 |
| 3,129,104 | 4/1964 | Callinan et al. | 106/31 |
| 3,157,677 | 11/1964 | Seibert et al. | 106/22 |
| 3,346,322 | 10/1967 | Finkenauer et al. | 8/527 |
| 3,353,972 | 11/1967 | Sinclair | 106/22 |
| 3,705,043 | 12/1972 | Zabiak | 106/22 |
| 3,766,116 | 10/1973 | Olhoft | 524/377 |
| 3,776,742 | 12/1973 | Sanders | 106/22 |
| 3,844,994 | 10/1974 | Vijayendran | 524/245 |
| 3,846,141 | 11/1974 | Ostergren et al. | 106/22 |
| 3,884,707 | 5/1975 | Dick et al. | 106/24 |
| 3,905,935 | 9/1975 | Irwin et al. | 524/377 |
| 3,907,694 | 9/1975 | Lu | 430/115 |
| 3,923,889 | 12/1975 | Schmeidl et al. | 106/23 |
| 3,969,264 | 7/1976 | Davis | 252/299.7 |
| 3,991,032 | 11/1976 | Pace | 524/88 |
| 3,994,736 | 11/1976 | Hertz et al. | 106/22 |
| 4,022,706 | 5/1977 | Davis | 428/1 |
| 4,028,119 | 6/1977 | Yamada et al. | 106/32 |
| 4,059,554 | 11/1977 | Pacansky | 524/386 |
| 4,086,054 | 4/1978 | Seibert et al. | 8/527 |
| 4,101,329 | 7/1978 | Loock | 106/22 |
| 4,106,027 | 8/1978 | Hoffmann et al. | 106/22 |
| 4,111,878 | 9/1978 | Ruhf | 524/376 |
| 4,115,613 | 9/1978 | Inoue et al. | 430/270 |
| 4,136,076 | 1/1979 | Daniels | 524/96 |
| 4,148,944 | 4/1979 | Ruhf | 427/256 |
| 4,163,001 | 7/1979 | Carumpalos et al. | 524/110 |
| 4,163,738 | 8/1979 | Corwin | 524/376 |
| 4,165,399 | 8/1979 | Germonprez | 427/264 |
| 4,165,741 | 8/1979 | Inoue et al. | 428/207 |
| 4,176,361 | 11/1979 | Kawada et al. | 346/1.1 |
| 4,225,475 | 9/1980 | Carumpalos | 524/394 |
| 4,227,930 | 10/1980 | Lin | 106/19 |
| 4,227,930 | 10/1980 | Lin | 106/19 |
| 4,229,219 | 10/1980 | Metz | 106/22 |
| 4,234,641 | 11/1980 | Thompson et al. | 428/159 |
| 4,239,543 | 12/1980 | Beasley | 106/22 |
| 4,248,636 | 2/1981 | Sasaki et al. | 106/23 |
| 4,306,875 | 12/1981 | De Feo et al. | 8/471 |
| 4,308,061 | 12/1981 | Iwahashi et al. | 106/22 |
| 4,365,035 | 12/1982 | Zabiak | 524/283 |
| 4,365,998 | 12/1982 | Sugiyama et al. | 106/22 |
| 4,386,961 | 6/1983 | Lin | 106/22 |
| 4,395,287 | 7/1983 | Kobayashi | 106/22 |
| 4,409,040 | 10/1983 | Tabayashi et al. | 106/20 |
| 4,421,559 | 12/1983 | Owatari | 106/22 |
| 4,422,854 | 12/1983 | Hahnle | 106/22 |
| 4,425,405 | 1/1984 | Murakami et al. | 428/342 |
| 4,446,174 | 5/1984 | Maekawa et al. | 427/261 |
| 4,460,727 | 7/1984 | Shoji | 524/215 |
| 4,505,944 | 3/1985 | Turner | 427/8 |

FOREIGN PATENT DOCUMENTS

| | | |
|---|---|---|
| 0050923 | 5/1982 | European Pat. Off. . |
| 2749503 | 5/1978 | Fed. Rep. of Germany . |
| 1367505 | 6/1964 | France . |
| 122552 | 10/1973 | Japan ............... 106/22 |
| 105278 | 12/1983 | Japan ............... 106/20 |
| 82084 | 4/1980 | Luxembourg . |
| 1592652 | 7/1981 | United Kingdom . |

OTHER PUBLICATIONS

*Kirk–Othmer Encyclopedia of Chemical Technology*, 3rd ed., vol. 20, John Wiley & Sons, New York (1982).

*Primary Examiner*—Theodore Morris
*Attorney, Agent, or Firm*—Donald E. Degling; Paul H. Ginsburg

[57] ABSTRACT

A printing ink particularly suitable for use in flexographic and letterpresses includes a basic dye, a polyhydric alcohol, water soluble carboxylic acid containing polymer and optionally water, thickeners, corrosion inhibitors and biocides. Preferably the water soluble carboxylic acid containing polymer is a homopolymer or copolymer of acrylic or methacrylic acid. The ink has an extremely high affinity for cellulosic and hemicellulosic substrates such as Kraft paper and newspaper. It forms a permanent bond to such substrates but does not easily dry out on the press rollers.

20 Claims, No Drawings

BASIC DYE INK FORMULATIONS AND METHODS

BACKGROUND OF THE INVENTION

Inks which are used in either flexographic printing presses or letterpress printing presses must adhere to any rollers in the ink train, wet the print roller and easily and evenly transfer over to the printed substrate and there form a permanent bond to the substrate.

A letterpress system has a series of rollers to pick up and form a uniform film of ink which is transferred by these rollers to the cylinder carrying the type. A letterpress uses raised type which is mounted on a cylindrical impression roller. The roller in turn is coated with the ink on the raised portions that form the characters and is turned against the paper or other substrate to be printed. Flexographic presses use an anilox metering roller in conjunction with form rollers or a doctor blade to define a uniform layer of ink which then is transferred to the print cylinder. Flexographic presses and letterpress presses these days for newspapers use type formed from photo-sensitive polymeric materials that can be formed directly from a light image. This polymeric cylinder when properly developed has raised areas that represent the image that is desired to be printed. This plate is mounted on a cylindrical roll which rotates against an ink cylinder so as to become coated in its raised areas. These areas rotate against a substrate (generally paper) which is backed by a hardened rubber roller.

Letter press and flexographic systems can be used with either solvent based or aqueous based ink systems. In either case, current practice generally provides for the blending of a pigment with a solvent or water in the presence of a binder resin such as, for example, nitrocellulose, maleic anhydride or acrylic copolymer or various starch derivatives. The pigment is impressed upon the paper by the printing roller and the binder serves to hold the pigment particles in place. In some instances, the pigment is carbon black directly suspended in a high boiling point aliphatic hydrocarbon. This ink has no binder but instead fixes to the paper by means of diffusion of the oil into the paper thus leaving a highly blackened layer of carbon black and oil upon the surface of the paper. These oil based systems suffer from a number of disadvantages including the fact that since the print never chemically bonds to the paper it can easily smudge when handled. Furthermore there is a tendency of the inks to contaminate the various guide rollers in the system and to cause a background.

A potential solution to these problems is the use of an ink which is formed from an inexpensive solvent system or carrier and a dye which bonds to the substrate. A class of dyes which will adhere to some degree to a paper substrate are the basic dyes. These basic dyes when in their colored form have a positive charge in solution which creates a strong affinity for low grade papers containing considerable hemicellulose. These dyes will also tend to form a water soluble salt with a water soluble polymer containing carboxylic moieties.

For a basic dye to be employed in an ink, particularly if used with a letterpress or flexographic presses, several problems must be solved. The ink must be relatively thick having similar rheological characteristics to current inks. Further the ink must not dry out on the ink train and print rollers. Currently presses especially letterpress presses may be turned off and left overnight and started up the next morning. Therefore, the inks must not dry out during this 8 to 16 hour period. Further the ink should be stable in time showing no tendency to coagulate or lose its intensity. Of course, the print must adhere strongly to the substrate.

Basic dyes in water do not have the inherent rheological characteristics required of a flexographic or letterpress ink. Further they tend to dry out and, most importantly, there is a tendency of some basic dyes to precipitate out of solution or to lose color through time.

The present invention is premised upon the realization that an ink suitable for use in flexographic and letterpress printing presses can be formulated using a basic dye wherein the ink includes as a carrier a polyhydric alcohol, water and a polycarboxylic acid containing polymer which controls the rheological characteristics of the ink, stabilizes the basic dye and controls the acidity of the ink. Furthermore, the polymer can form a salt with the basic dye which is very sparingly soluble in water but readily dissolves in the glycol water mixtures of this invention. Thus after an image is printed and the glycol water mixture has diffused into the paper, subsequent exposure to water results in little bleed or smearing of the image. In accordance with the present invention, an ink can be formulated which forms a color-fast bond to a cellulosic substrate, has adequate viscosity for use in letter and flexographic presses, does not dry out overnight, and has no tendency to coagulate or loose its color intensity.

DETAILED DESCRIPTION

Ink formulations for use with flexographic or letterpress presses include a basic dye, a polyhydric alcohol and a polymeric acid soluble in the alcohol and water.

Basic dyes are a class of dyes which are generally cationic in solution. The chemical class of basic dyes commonly used today are triarymethane, xanthene, acridine, oxazine, thiazine, azine, cyanine, hemicyanine, azocarbocyanine and azo. Exemplary basic dyes include Aurimines O or G, Malachite Green, Basic Blue 1, Basic Green 1, Basic Red 12, Basic Violet 14, Basic Violet 15, Basic Violet 16, Basic Violet 1, Basic Red 14, Basic Red 15, Basic Violet 3, Basic Violet 2, Victoria Blue R, Victoria Pure Blue BO, Victoria Blue 4R, Pyronines G and Y, Rhodamines B and 6G, Rosaniline, Safranine T, Lauth's Violet, Methylene Blue, Methylene Green, Chrysoidine and Bismark Brown, Basic Yellow 11, Basic Yellow 6 or 7, Basic Orange 4–11, 21 and 22 as well as others. These dyes are all classified as basic dyes in the Color Index[1] and are well known to those of ordinary skill in the art.

[1] *Color Index Third Edition*, The American Color Association of Textile Chemists and Colorists, P.O Box 12215 Research Triangle Park, N.C. 27709

Unless otherwise indicated in this description and the following claims, all percentages indicate the weight percent based on the total weight of the ink formulation.

The basic dyes are present in the ink formulation of the present invention in an amount sufficient to produce the desired intensity of color. This level could vary from a very light shade requiring a small percentage (0.01%) of basic dye in the formulation to up to 10–20%. The actual amount will again vary depending upon the intensity of the color produced by the individual basic dye. Generally at least about 1% is preferred. By way of example, a process blue ink for newspapers includes 2% Basic Blue 1, for a process red ink about 2% Basic Violet 10 and for a process yellow ink 3%

Aurimine O. Further examples will provide other preferred concentrations of specific basic dyes realizing that dye strength may vary from different manufacturers and from time-to-time.

The carrier for the basic dye includes a polyhydric alcohol, or water soluble ether derivatives of polyhydric alcohols. The polyhydroxyl compounds also referred to as polyols, are preferably glycols and must be soluble in water and act to dissolve basic dyes. Suitable polyols include ethylene glycol, diethylene glycol, polyethylene glycol, glycerol, triethylene glycol, polyproplyene glycol, 1,2-propanediol, 1,3-propanediol, 1,2 butanediol, 1,3 butanediol, 2,3 butanediol, 1,4-butanediol, hexylene glycol, diproplyene glycol, neopentyl glycol, 1,4-cyclohexanedimethanol, erythritol, and sorbitol. Suitable ether derivatives of polyhydric alcohols include methyl and ethyl ether derivatives of ethylene glycols better known as Cellosolves (sold by Union Carbide) particularly methyl or ethyl Cellosolve. The polyol should include at least 2 hydroxyl groups and no less than 1 hydroxyl or ether group per four carbon atoms and preferably no less than one hydroxyl per 3 carbon atoms. The polyol provides good printability on flexographic and letterpress printing apparatuses.

The basic dye must be soluble in the selected polyols or in an aqueous solution of the polyol if the polyol is a solid such as sorbitol. The polyols do not evaporate easily. Thus the polyol prevents the ink from drying out on a printing roller even when left overnight, i.e., 8–16 hours. The ink of the present invention should include at least about 40% and up to about 98% polyol (weight percent). The preferred range, however, is from 40–70% and more preferably from 50–60% polyol. The actual percentage may vary depending on the particular dye and polyol used. Higher percentages of polyol tends to cause the dye to penetrate or show through a paper substrate and also increase the cost of the ink.

The ink includes a polymer which is soluble in the selected polyol and includes carboxylic acid functionalities or moieties. This polymer with such functionalities is referred to as the polymeric acid. The polymeric acid provides several functions. It establishes the viscosity of the ink at a level which is high enough to be useful as a flexographic or letterpress ink. For purposes of the present invention the viscosity of the final ink solution should be approximately 18 seconds on a Zahn No. 2 cup for a flexographic system and about 38 seconds on a Zahn No. 3 cup to 30 seconds on a Zahn No. 4 cup for a letterpress press.

The polymeric acid further maintains the pH of the ink sufficiently low to maintain the basic dye in solution and prevent the basic dye from going into the leuco form. When the pH is too high the dyes change from their cationic form to a neutral state which has a less intense or no color and are also less soluble in the carrier.

The polymeric acid also forms a salt with the dye ion and tends to render it insoluble in water but soluble in the glycol water mixture of this invention. Thus upon printing the glycol water tends to diffuse into the paper forming a water fast image.

The inks of the present invention generally must have a pH below about 8 to prevent a change to the leuco form. Certain basic dyes are stable only at much lower pHs, i.e., 6 or lower.

Accordingly, since the polymer acid provides three functions, i.e., control of viscosity, control of pH to maintain the basic dye in solution and in a cationic form, and control of the solubility of the dye in water, the amount of polymer acid will vary based on the viscosity requirements, the pH requirement for the particular dye used and the solubility of the dye polymeric acid complex.

The amount of polymer acid added is also dependent upon the particular polymer and its molecular weight. The higher molecular weight polymer will more easily increase the viscosity of the solution, so that less polymeric material need be used to achieve desired viscosity. On the other hand, high molecular weight tends to be associated with a high degree of psuedoelasticity, which if too great is undesirable from the standpoint of printability. When the polymeric acid is polyacrylic acid or polymethacrylic acid, the molecular weight should be between 5,000 and 450,000 weight average molecular weight, preferably about 180,000. This range, of course, will vary with different polymers.

A polymer having more acid functionalities will also decrease the pH more readily. Preferably, a homopolymer of acrylic acid or methacrylic acid or a copolymer of acrylic acid and methacrylic acid will be used for the present invention. However, other polymers can be used, formed from acrylic or methacrylic acid and monomers such as acrylamides, acrylonitriles, styrene, ethylene and other vinyl materials. Further hydrolyzed styrene-maleic anhydride copolymers as well as hydrolyzed ethylene- maleic anhydride copolymers can also be used in the present invention. These polymers have a high proportion of carboxylic acid moieties and are soluble in glycols. Preferably the ink of the present invention includes between about 0.2% and about 10% (based on solids) or more by weight of polymeric acid.

Due to the fact that the inks of the present invention are relatively acid they should include a corrosion inhibitor. Such corrosion inhibitors or metal protecting agents may include chromates, benzotriazol, mercaptobenzothiazol, borax, boric acid, sodium silicate, benzoic acid, or any of a large number of proprietary inhibitors available from various manufacturers. A biocide may also be used in the present invention.

The ink may include other thickening agents than the polymer acid usually in the range of from 0–10% to impart specific rheological effects. Suitable thickening agents include hydroxypropylcellulose and hydroxyethylcellulose.

The ink includes 0% to about 57% water. If no water is present, more polyhydric alcohol is used. Such use causes the ink to be more expensive and may contribute to too much penetration of the substrate. Therefore, the ink preferably includes from about 10% to about 50% water and more preferably 20% to 50%.

To formulate an ink according to the present invention, the basic dye, polyhydric alcohol, and polymer acid and any remaining components such as water, corrosion inhibitor and bricide are simply combined together with agitation to form a solution. The proportion of materials are controlled as described above to provide an ink having a desired color intensity and a viscosity adequate for use in a flexographic or letterpresses. Surprisingly the inks made according to the preceding description are particularly suitable in both letterpresses and flexographic presses. These inks adequately wet the presses, remain in a liquid state for over 16 hours, do not coagulate and do not loose their intensity. Further, they bond strongly to cellulosic substrates such as newspaper and kraft paper.

The present invention will be further appreciated in light of the following examples.

Example I: Black newspaper flexographic ink.

Sixty liters of diethylene glycol were metered with 9.5 liters of Rohm and Haas A-3 polyacrylic acid polymers (25% solids) and 30.5 liters of pure water and 100 grams of benzotriazole added. Two kilograms each of Dye Specialities Malachite Green crystals, Fuchsine YS and Diacolor Auramine O were added and the mixture stirred and filtered through a cloth filter.

Example II: A process blue for a newspaper flexographic ink

All ingredients and procedures used in Example I were used to produce this ink except that 2 kilograms of Dye Specialities Basic Blue 1 and one kilogram Dye Specialities Victoria Pure Blue BO were used in place of the dyes listed in Example I.

Example III: A process red for a flexo graphic newspaper ink

The same ingredients and procedures used in Example I were used in this example except that the dyes used were 2 kilograms Dye Specialities Rhodamine B and 200 grams Atlantic Chrysoidine.

Example IV: A process yellow for a newspaper flexographic ink

The same ingredients and procedures used in Example I were used in this example except for the dyes which are changed to 5 kilograms Diacolor Auramine O and 500 grams Mobay Basic Yellow 28.

Example V: A black letterpress ink.

Sixty (60) liters of diethylene glycol was mixed with 30.5 liters of Rohm and Haas A-3 polyacrylic acid solution concentration (25% solids) along with 9.5 liters of pure water. 100 grams of benzotriazole is then added as are one kilogram of BASF Crystal Violet, 1.1 kilograms of Diacolor Aurimine O and 0.8 kilograms of Atlantic Chrysoidine.

Example VI: A black newspaper letterpress ink

This ink is formulated with the same ingredients and procedures as used in Example V except that instead of 30.5 liters of Rohm and Haas A-3 and 9.5 liters of water there is 9.5 liters of Rohm and Haas A-3 and 30.5 liters of a 1% solution in pure water of Klucel H hydroxypropyl cellulose.

The inks made according to the present invention are relatively inexpensive, use inexpensive and low volatile carrier compositions, forms a waterfast image on paper and is suitable for highly demanding applications such as letterpress and flexographic presses.

Thus having described my invention and many of its unexpected advantages, I claim:

1. An ink comprising:
a basic dye in an amount effective to provide a visible mark on a substrate, said basic dye dissolved in a solution,
said solution comprising at least about 40% by weight to about 98% by weight of a plyhydric alcohol having at least one hydroxyl group per 4 carbon atoms of said alcohol or a water-soluble ether derivative of said polyhydric alcohol, and a water soluble polymeric acid present in an amount effective to maintain said basic dye dissolved in said solution, said amount being at least about 0.2% by weight said ink having a pH less than 8 at which the basic dye is prevented from changing its leuco form.

2. The ink claimed in claim 1 wherein said solution further includes from about 20% to about 50% water.

3. The ink claimed in claim 1 wherein said basic dye is present in an amount from about 0.3% to about 20%.

4. The ink claimed in claim 2 wherein said polyhydroxyl alcohol is present in an amount from about 40% to about 70% by weight.

5. The ink claimed in claim 4 wherein said polyhydroxyl alcohol is present in an amount from about 40% to about 60%.

6. The ink claimed in claim 1 wherein said polymeric acid is selected from the group consisting of polyacrylic acid, polymethacrylic acid, and copolymers of acrylic acid and methacrylic acid.

7. The ink claimed in claim 6 wherein said polymeric acid is present in an amount from about 0.2% to about 10%.

8. The ink claimed in claim 1 further comprising a corrosion inhibitor.

9. The ink claimed in claim 1 further comprising a water soluble thickening agent.

10. The ink claimed in claim 8 wherein said thickening agent is selected from the group consisting of hydroxyethylcellulose and hydroxypropylcellulose.

11. The ink claimed in claim 8 wherein said thickening agent and said polymeric acid are present in amounts effective to establish the viscosity of said ink at at least about 18 seconds on a Zahn No. 2 cup.

12. The ink claimed in claim 10 wherein said thickening agent and said polymeric acid are present in an amount effective to establish said viscosity at at least about 38 seconds on a Zahn No. 3 cup.

13. The ink claimed in claim 4 wherein said polyhydroxyl alcohol is selected from the group consisting of ethylene glycol, polyethylene glycol, glycerol, triethylene glycol, polyproplyene glycol, 1,2-propanediol, 1,3-propanediol, hexylene glycol, diproplyene glycol, 1,3-butanediol, 1,2-butanediol, 1,4-butanediol, 2,3-butanediol, neopenyl glycol, 1,4-cyclohexanedimethanol, diethylene glycol, erythritol, and sorbitol.

14. The ink claimed in claim 13 wherein said polyhydroxyl alcohol is selected from the group consisting of ethylene glycol, diethylene glycol, propylene glycol, and dipropylene glycol.

15. An ink comprising a solution from about 0.3% to about 10% of a base dye;
from about 40% to about 70% of a water soluble glycol;
from about 10% to about 50% water;
from about 0.2% to about 10% of water soluble polymeric acid, and 0% to about 10% thickening agent, selected from the group consisting of hydroxyethyl cellulose hydroxypropylcellulose said ink having a pH less than 8 at which the basic dye is prevented from changing its leuco form.

16. An ink comprising:
a basic dye in an amount effective to provide a visible mark on a substrate, said basic dye dissolved in a solution;
said solution comprising at least about 40% to about 90% by weight of a water soluble compound selected from the group consisting of water soluble polyhydric alcohols and water soluble ether derivatives of polyhydric alcohols and a water soluble polymeric acid present in an amount effective to maintain said basic dye dissolved in said solution, said amount being at least about 0.2% by weight said ink haviing a pH less than 8 at which the basic dye is prevented from changing its leuco form.

17. The ink of claim 1, wherein the polymeric acid forms a salt with the dye ion and tends to render it insoluble in water but soluble in the solvent of claim 1.

18. The ink of claim 1, wherein the viscosity is approximately 18 seconds on a Zahn No. 2 cup for a flexographic ink and about 38 seconds on a Zahn No. 3 cup to 30 seconds on a Zahn No. 4 cup for a letterpreess ink.

19. An ink comprising:
a basic dye in an amount effective to provide a visible mark on a substrate, said basic dye dissolved in a solution, said solution comprising at least about 40% by weight to about 98% by weight of a polyhydric alcohol having at least one hydroxyl group per 4 carbon atoms of said alcohol or a water-soluble ether derivative of said polyhydric alcohol, and a water soluble polymeric acid present in an amount effective to maintain said basic dye dissolved in said solution, said amount being at least about 0.2% by weight, said ink having a pH of 6 or lower.

20. The ink of claim 18, wherein the viscosity is about 38 seconds on a Zahn No. 3 cup to 30 seconds on a Zahn No. 4 cup for a letterpress ink.

* * * * *

UNITED STATES PATENT AND TRADEMARK OFFICE
CERTIFICATE OF CORRECTION

PATENT NO. : 4,657,590

DATED : April 14, 1987

INVENTOR(S) : Rodger L. Gamblin

It is certified that error appears in the above-identified patent and that said Letters Patent is hereby corrected as shown below:

Prior art cover page After "2,621,130  12/1952 Cutler et al. ... 106/24" delete "2,623,827 12/1952 Manuel ... 106/23

Column 5, line 63, "plyhydric" should be -- polyhydric --

Column 6, line 50, "base" should be -- basic --.

Signed and Sealed this

Sixteenth Day of February, 1988

Attest:

DONALD J. QUIGG

Attesting Officer

Commissioner of Patents and Trademarks